(12) United States Patent
Gospodarek et al.

(10) Patent No.: US 9,712,559 B2
(45) Date of Patent: Jul. 18, 2017

(54) IDENTIFYING FRAMES

(75) Inventors: Andrew Gospodarek, Raleigh, NC (US); Neil Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 51 days.

(21) Appl. No.: 13/485,339

(22) Filed: May 31, 2012

(65) Prior Publication Data

US 2013/0322438 A1 Dec. 5, 2013

(51) Int. Cl.
| | |
|---|---|
| *H04L 12/28* | (2006.01) |
| *H04L 5/14* | (2006.01) |
| *H04B 7/00* | (2006.01) |
| *G01R 31/08* | (2006.01) |
| *H04L 29/06* | (2006.01) |

(52) U.S. Cl.
CPC ...... *H04L 63/1466* (2013.01); *H04L 63/0236* (2013.01); *H04L 63/162* (2013.01)

(58) Field of Classification Search
CPC ..... H04L 12/56; H04L 2012/56; H04L 29/06; H04L 63/1466
USPC ....... 370/389, 390.401; 709/251; 726/11, 13
See application file for complete search history.

(56) References Cited

U.S. PATENT DOCUMENTS

| | | | | |
|---|---|---|---|---|
| 6,067,620 A * | 5/2000 | Holden | ............... | H04L 63/0218 713/155 |
| 6,473,411 B1 * | 10/2002 | Kumaki | ................. | H04L 29/06 370/331 |
| 7,602,706 B1 * | 10/2009 | Gardo | ................... | H04L 12/437 370/219 |
| 7,857,619 B2 * | 12/2010 | Liu | ...................... | A61C 19/004 359/622 |
| 8,495,195 B1 * | 7/2013 | Abidogun | ............... | H04L 67/04 709/223 |
| 2002/0069294 A1 * | 6/2002 | Herkersdorf et al. | ........ | 709/238 |
| 2005/0152305 A1 * | 7/2005 | Ji | ............................ | H04L 45/54 370/328 |
| 2006/0109802 A1 * | 5/2006 | Zelig | ....................... | H04L 12/42 370/258 |
| 2006/0184789 A1 * | 8/2006 | Karasawa | ........... | H04L 63/0428 713/160 |
| 2007/0140213 A1 * | 6/2007 | Milligan | ............. | H04L 12/1836 370/351 |
| 2007/0165561 A1 * | 7/2007 | Veerepalli | ............. | H04W 80/04 370/328 |
| 2008/0240112 A1 * | 10/2008 | Muqattash | ........... | H04W 40/28 370/395.31 |
| 2009/0080447 A1 * | 3/2009 | Sawada et al. | ............... | 370/401 |
| 2009/0092144 A1 * | 4/2009 | Wepiwe | .................. | H04L 12/42 370/406 |
| 2012/0106552 A1 * | 5/2012 | Iwao | ....................... | H04L 45/36 370/392 |

* cited by examiner

*Primary Examiner* — Faruk Hamza
*Assistant Examiner* — Abu-Sayeed Haque
(74) *Attorney, Agent, or Firm* — Lowenstein Sandler LLP

(57) ABSTRACT

A frame identifier running on a computing device generates identifier values and embeds the identifier values in a networking frame. The frame identifier also receives networking frames, and analyzes the received networking frames to identify a subset of received networking frames containing the identifier values. The identifier values indicate that corresponding received networking frames were originated from the network device. The frame identifier also discards the identified subset of received networking frames.

19 Claims, 7 Drawing Sheets

300

| Hardware Type 312 | | Protocol Type 314 |
|---|---|---|
| Hardware Address Length 316 | Protocol Address Length 318 | Opcode 320 |
| Sender Hardware Address 304 | | |
| | | Sender Protocol Address 308 |
| Sender Protocol Address 308 | | |
| | | Target Hardware Address 306 |
| Target Protocol Address 310 | | |
| Mark 302 | | |

FIG. 3

IDENTIFYING FRAMES

TECHNICAL FIELD

This disclosure relates to the field of computing, and in particular, to the identification of looped-back frames in a computing network.

BACKGROUND

In computer networking, a frame is a data transmission or data packet that includes a sequence of bits that identify the beginning and the end of the packet in a stream of bits. Generally, a network is designed to not "loop back" frames to the originating system, or in other words, to forward frames back over a network connection to a network-attached device that initially transmitted the frames. However, there are cases in which the network may unknowingly do so, and the network-attached device should determine if such a received frame was one which was self-originated, or originated elsewhere.

Furthermore, determining the origination status (e.g., self-originated, or originated by another device) of a frame may be a non-trivial task. For example, one situation where looped-back frames are problematic includes a server with multiple bonded network adapters connecting the server to the network. A packet or frame may be sent out over one network adapter and received by the server at a second network adapter. Another example includes a malicious attempt to penetrate a network using Address Resolution Protocol (ARP) spoofing. ARP spoofing is a technique whereby an attacker sends fake ("spoofed") ARP messages onto a Local Area Network. Generally, the aim is to associate the attacker's MAC address with the IP address of another host (such as the default gateway), causing any traffic meant for that IP address to be sent to the attacker instead.

ARP spoofing may allow an attacker to intercept data frames on a LAN, modify the traffic, or stop the traffic altogether. Often the attack is used as an opening for other attacks, such as denial of service, man in the middle, or session hijacking attacks. Identifying frames that are self-originated in these situations is difficult, particularly in these cases where the frame is intended to determine inappropriate address reuse on a network. In these situations, separating looped-back frames from legitimately independent frames from systems competing for the same network address is ambiguous at best and can lead to significant network failures such as lost packets, network collisions, etc.

BRIEF DESCRIPTION OF THE DRAWINGS

Embodiments of the present disclosure are illustrated by way of example, and not by way of limitation, and can be more fully understood with reference to the following detailed description when considered in connection with the figures in which:

FIG. 3 illustrates an example frame used with embodiments of the present invention.

DETAILED DESCRIPTION

Figure 1:
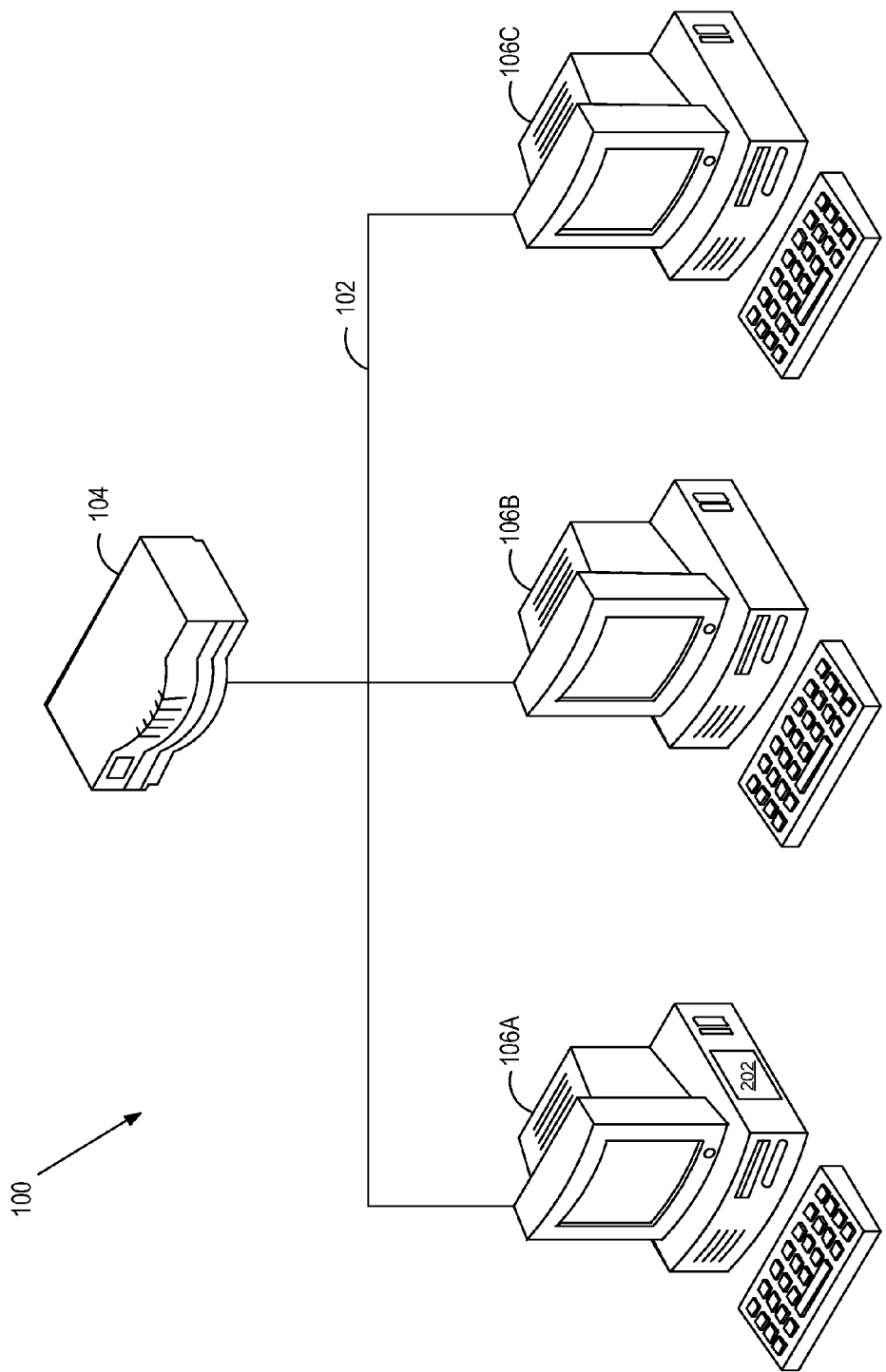
FIG. 1 illustrates one embodiment of a computing network.

Described herein are methods and systems for embedding frame identifiers in network switchable frames. Embodiments of the present disclosure provide a frame identifier configured to generate identifier values and embed the identifier values in networking frames. When the frame identifier receives a networking frame over a communication channel, it analyzes the received networking frame to determine if the received networking frame includes an identifier value embedded by the frame identifier, a different identifier value, or no identifier value.

As result, embodiments of the present disclosure allow a system to quickly determine if a frame is self-originated and therefore may be dropped without processing the frame. This beneficially allows for an avoidance of misbehavior of the network protocol that the looped-back frame belongs to. As one of skill in the art will recognize, the nature of the misbehavior depends on the specific protocol in use. One example of misbehavior specific to the ARP protocol is the termination of communication over a specific port. In other words, if an ARP frame is looped back and not detected, it is likely that the operating system will believe that another host with the same MAC address exists on network, with the result being that the originating host may disallow further network communication on the port.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "comparing," "analyzing," "parsing," "identifying," "storing," "accessing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

FIG. 1 illustrates one embodiment of a computing network 100. The network 100 is depicted with minimal components for clarity only, and it is to be understood that the features of the disclosure that follow are capable of being implemented in any network where at least one process or device is able to send/receive data to/from at least one other process or device over the network 100. The network 100 may be a public network (e.g., Internet), a private network (e.g., a local area Network (LAN) or wide area network (WAN)), or a combination thereof. The network 100 may additionally include a wireless network such as provided by a wireless carrier.

The network 100 may comprise any number of devices coupled with a communication channel 102. The communication channel 102 may be any link that interconnects two or more devices, including but not limited to, electrical cables, optical fibers, optical signals, and radio waves.

Examples of devices coupled with the communication channel 102 include, but are not limited to, router(s) 104, computing devices 106a-c, network interface cards, repeaters, hubs, bridges, switches, and firewalls. The network 100 may also be implemented as virtual network-connected devices communicating across a virtual network operating within another computing system. As such, the communication channel 102 is a virtual network coupling virtual computing systems and a virtual router, for example.

The computing devices 106a-c communicate across the communication channel 102 to share data. Computing devices 106a-c may be, for example, personal computers (PC), palm-sized computing devices, personal digital assistants (PDA), mobile phones, tablet computers, game consoles, desktop computers, servers, databases, or other computing devices. Computing devices 106a-c may also be electronic devices with embedded systems, such as routers, televisions, refrigerators, coffee makers, home security systems, kitchen appliances, consumer electronics, and so forth. Alternatively, computing devices 106a-c may be servers, databases, or other devices that make available services to other computing devices over the network 200.

The communications between computing devices 106 may be organized or formatted as frames. A frame, for example, is a sequence of bits or symbols that identify to a receiver of the frame the beginning and end of the frame.

Although most network-connected devices and processes utilize Layer 3 protocols (e.g., IPv6, IPv4, IPX, Appletalk, etc.) for addressing, communicating across the network 100 may require that a source device identify the hardware layer address (e.g., MAC address) of a target device. Before a computing device 106a-c can transmit a frame across the communication channel 102 to a target device, the computing device 106a-c discovers the link layer or hardware layer address of the target device or process. The computing devices 106a-c may be configured to transmit an Address Resolution Protocol (ARP) frame or Neighbor Discovery Protocol (NDP) frame to resolve the network layer address of the target device into a link layer address. ARP frames are used in networks 100 based on IPv4, Chaosnet, DECnet, and other networks using IEEE 802 standards. NDP frames are used in networks 100 based on IPv6 addressing.

The ARP or NDP frame is transmitted by, for example, the computing device 106a, to request the address resolution of computing device 106b, which may be a target. Computing device 106a, in this example, first performs a lookup in a repository or table to determine if the hardware level address of the computing device 106b is cached in the repository or table. If not found, the computing device 106a broadcasts a message to all network-attached devices requesting a reply that contains the hardware level address for the computing device 106b.

The network 100 is configured to not loop frames back to an originating computing device 106a-c. Stated differently, the network 100 does not typically forward frames over the communication channel 102 to a device that initially transmitted the frame. However, there are situations where a network-connected device may forward the frame to the originating computing device 106a-c which may cause network failures including lost frames. Generally speaking, looped back frames can cause a general desynchronization of a network state versus other systems on the network (e.g. a system's ARP tables may have erroneous entries indicating other systems with the same MAC address as the local system that do not actually exist). The general result of such a condition is frame loss, and lack of connectivity to a network for the local system. Beneficially, the computing devices 106a-c include a frame identifier 202 for determining if a frame originated at the receiving device or at a different computing device. The frame identifier 202 is described hereinafter in greater detail with reference to FIG. 2.

Figure 2:
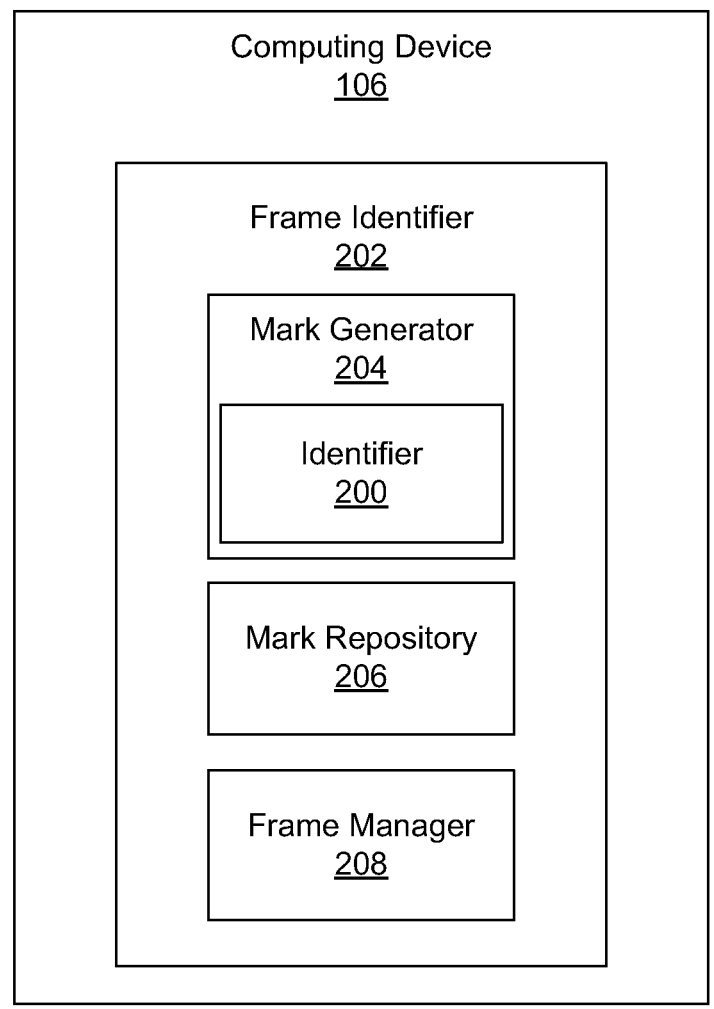
FIG. 2 illustrates one embodiment of the computing device configured to identify frames.

FIG. 2 illustrates one embodiment of the computing device 106 configured to identify frames. The computing device 106 includes a frame identifier 202 configured to analyze packets communicated across a network 100. The frame identifier 202, as will be discussed below with reference to FIG. 6, may be implemented in a computing system as an application operating within an operating system, as part of a network interface driver, or as part of firmware of the network interface driver.

The frame identifier 202 is configured to analyze transmitted and received network frames to determine the origin of each network frame. In one embodiment, the frame identifier 202 embeds a unique mark or identifier 200 into network frames before transmitting the network frames across the network 100. A mark generator 204 creates identifiers 200 for embedding within the network frames. The mark generator 204 may create a single identifier 200 that identifies the originating system, or a plurality of identifiers 200 that identify the originating system.

The mark generator 204 is configured, in one embodiment, to create a mark that is easily computed, reversible, and highly unlikely to be reproduced by another system on the same network. One example of a suitable mark is a randomly generated value that is applied to appropriate outgoing network frames. In another embodiment, the mark is any identifier selected by the mark generator that uniquely identifies the computing device.

Alternatively, the mark generator 204 is configured with a cryptographic random number generator. In this example, the mark generator 204 may be seeded with a 'nonce' extracted from a true random number generator, and configured to generate a mark that includes a tuple <index: data>, where index is the number of bytes extracted from the cryptographic random number generator at the time the associated data was read from the cryptographic random number generator. Beneficially, the cryptographic random number generator's output can be predicted and reversed by a system in possession of the nonce, thereby allowing the computing device that originated the mark to reverse the mark and identify frames that are being looped back.

The mark repository 206 is configured to maintain marks created and embedded into network frames. The mark repository 206 is, in one embodiment, a data structure configured to maintain a list of identifiers 200 generated by the mark generator 204. The mark repository 206 may be stored in random access memory as, for example, a lookup table. The mark repository 206 stores the identifier(s) 200 that the frame identifier 202 embeds in frames. The mark repository 206 is also configured to respond to a lookup request from the frame manager 208.

The frame manager 208 is configured to extract the identifier(s) 200 from incoming or received frames and analyze the identifier to determine if the frame self-originated. In other words, the frame manager 208 analyzes the identifier(s) 200 to determine if the identifier(s) 200 match identifier(s) stored in the mark repository 206. A match indicates a looped back frame, while a non-match indicates an independently generated frame from an alternate system.

In one example, the frame manager 208 is configured to analyze a cryptographically generated identifier. The output of a cryptographic random number generator of the mark generator 204 can be predicted and reversed by a system in possession of the nonce, therefore, the frame manager 208 is configured to predict a cryptographically generated identifier 200 using the seed key of the cryptographic random number generator and compare the predicted output with the identifier 200 from a received frame. This beneficially affords greater security against potential malicious attacks from systems attempting to impersonate the originating system.

FIG. 3 illustrates an example frame 300 used with embodiments of the present invention. The frame 300 is an example of an ARP frame with an embedded identifier or mark 302, however, as one of skill in the art will recognize, the identifier or mark 302 may be embedded within any frame capable of being transmitted across a communication channel. Placement of the mark 302 within any given frame is dependent upon the protocol that the frame identifier 202 is configured to identify. In one example, the protocol is a network neighbor discovery protocol, such as ARP or NDP as described previously.

The frame 300, in one embodiment, is an ARP frame that, as one of skill in the art will recognize, uses a simple message format that contains one address resolution request or response. The size of the ARP message depends on the upper layer and lower layer address sizes, which are given by the type of networking protocol (usually IPv4) in use and the type of hardware or virtual link layer that the upper layer protocol is running on. The message header specifies these types, as well as the size of addresses of each. The message header is completed with the operation code for request (1) and reply (2). The payload of the packet consists of four addresses, the hardware and protocol address of the sender and receiver hosts.

The frame 300, in one embodiment, has 48-bit fields for the sender hardware address 304 (SHA) and target hardware address (THA) 306, and 32-bit fields for the corresponding sender and target protocol addresses (SPA and TPA) 308, 310. The hardware type 312 specifies the network protocol type, for example Ethernet. The protocol type 314 specifies the internet protocol for which the ARP request is intended. For IPv4, this has the value 0x0800. The permitted PTYPE values share a numbering space with those for EtherType.

The hardware address length 316 specifies the length (in octets) of a hardware address, and the protocol length 318 specifies the length (in octets) of addresses used in the upper layer protocol (the upper layer protocol specified in PTYPE). Opcode 320 specifies the operation that the sender is performing, for example, 1 for request, and 2 for reply.

The mark 302, in one example, may be embedded in the frame 300 following the ARP header (following the Opcode 320), or as depicted following the target protocol address 310. It is to be understood that this is a specific example only of a mark 302 or identifier in an ARP frame 300, but the mark 302 may be embedded into other types of network frames.

Figure 4:
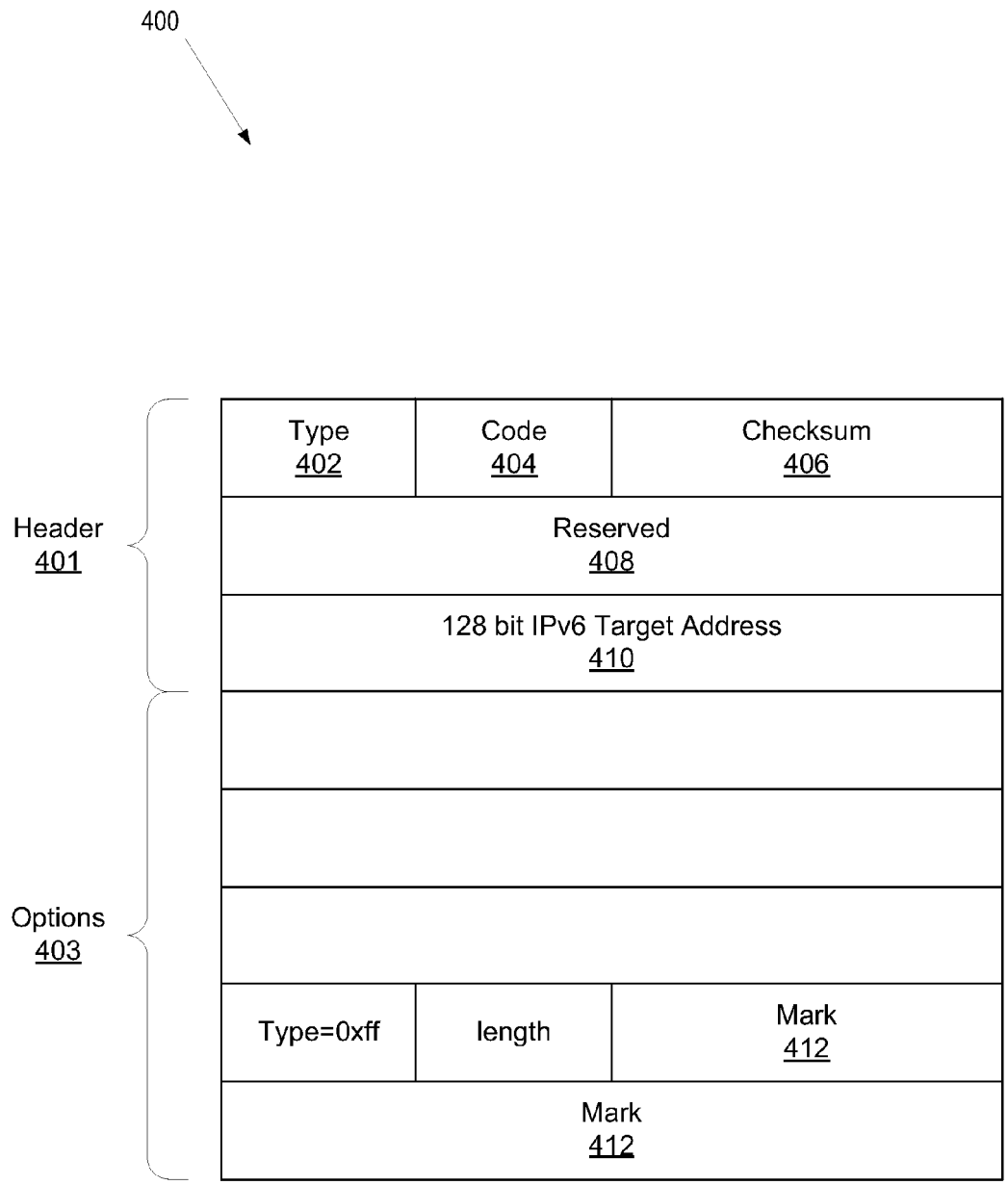
FIG. 4 illustrates an example frame that may be used with embodiments of the present invention.

FIG. 4 illustrates an example frame 400 that may be used with embodiments of the present invention. Frame 400 is an example of a network discovery protocol (NDP) frame. NDP operates in the Internet Layer of the Internet model (RFC 1122) and is responsible for address autoconfiguration of nodes, discovery of other nodes on a link, determining the Link Layer addresses of other nodes, duplicate address detection, finding available routers and Domain Name System (DNS) servers, address prefix discovery, and maintaining reachability information about the paths to other active neighbor nodes (RFC 4861).

NDP allows for packet types that may include router solicitation, router advertisement, neighbor solicitation, neighbor advertisement, and redirect. These types may enable the following functionality: router discovery (hosts can locate routers residing on attached links); prefix discovery (hosts can discover address prefixes that are on-link for attached links); parameter discovery (hosts can find link parameters); address autoconfiguration (stateless configuration of addresses of network interfaces); address resolution (mapping between IP addresses and link-layer addresses); next-hop determination (hosts can find next-hop routers for a destination); neighbor unreachability detection (determine that a neighbor is no longer reachable on the link); duplicate address detection; redirect; and Recursive DNS Server (RDNSS) and DNS Search List (DNSSL) assignment.

The frame 400, as illustrated, comprises a header 401 and options 403. The header includes the type or version 402, the code 404, checksum 406, reserved section 408, and target address 410. The header may also include source address, traffic classification options, a hop counter, and a pointer for extension headers, if any.

According to the NDP protocol, based on RFC 2461, all encoded information in a frame should be in the form of an NDISC option. An NDISC option may be a variable set of optional data appended to the frame 400 using the tuple format <type:length:data>. The identifier or mark 412 may be embedded as an option with an undefined type value. Alternatively, the mark 412 may be embedded as an option with a defined type value.

Embodiments of the present disclosure are described hereinafter with reference to flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by processing logic. The processing logic may comprise hardware (circuitry, dedicated logic, etc.), software (such as is run on a general purpose computer system or a dedicated machine), or a combination of both. These software, or other computer program instructions, may be provided to a processor of a general purpose computer, special purpose computer, or other programmable data processing apparatus to produce the processing logic, such that the instructions, which execute via the processor of the computer or other programmable data processing apparatus, implement the functions specified in the flowchart and/or block diagram block or blocks.

Figure 5:
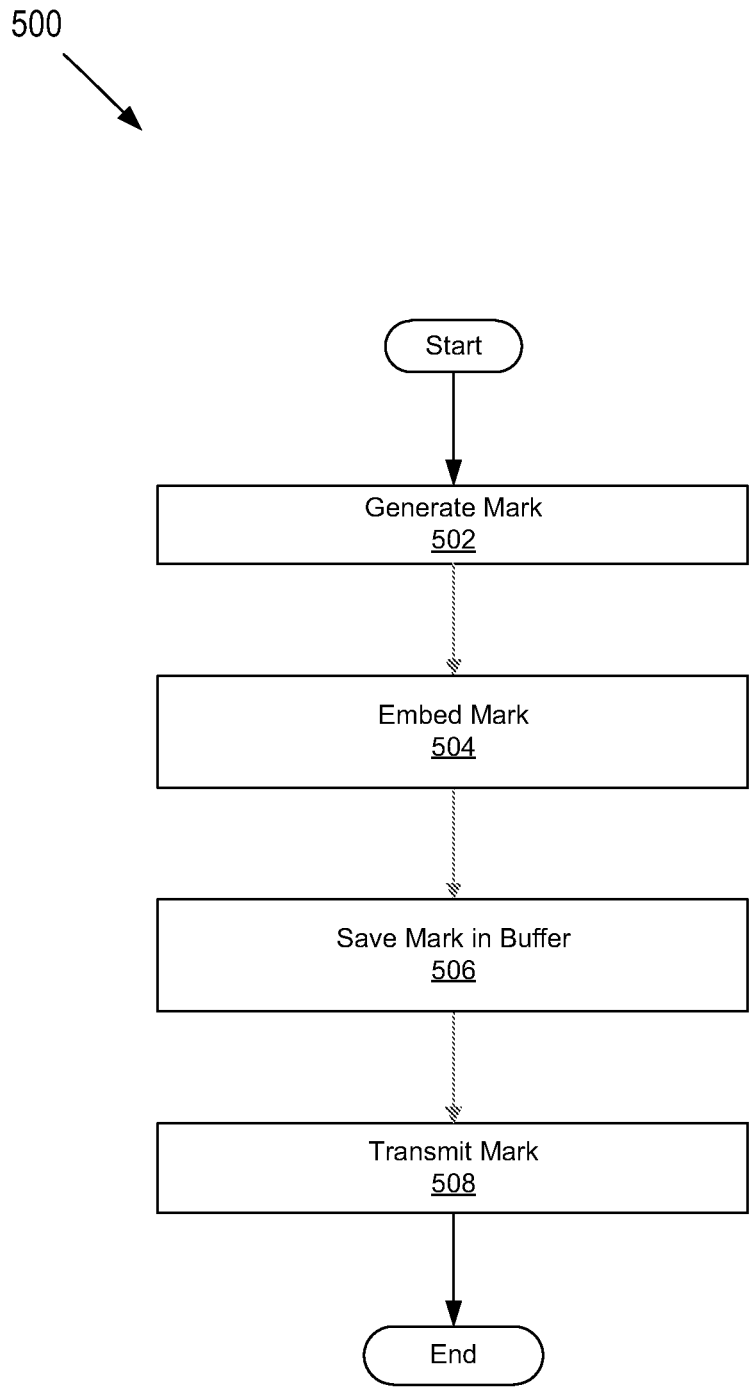
FIG. 5 illustrates a flow diagram of one embodiment of a method for generating and embedding an identifier in a frame.

FIG. 5 illustrates a flow diagram of one embodiment of a method 500 for generating and embedding an identifier in a frame. The method is performed by processing logic that may comprise hardware (circuitry, dedicated logic, etc.), software (such as is run on a general purpose computer system or a dedicated machine), or a combination of both. In one embodiment, the method is performed by a computing device (e.g., a frame identifier 202 of computing device 106 of FIG. 2).

At block 502, the processing logic generates a mark. The mark, or identifier, comprises an encoding that uniquely identifies the mark. The value of the mark may be easily computed and reversible, and be highly unlikely to be reproduced by another instance of the processing logic operating on a separate computing system.

In another embodiment, the value of the mark is a constant, predetermined value based upon a characteristic of the originating computing system. For example, the mark may be a unique reference number similar to a Universally Unique Identifier (UUID) or a Globally Unique Identifier (GUID) that is based on hardware and/or software characteristics and may be combined with a timestamp.

In another embodiment, the processing logic generates 502 a random mark with a sufficiently large value that there is a very small possibility that a second processing logic operating on a second computing system generates an identical mark value. For example, the processing logic may generate 502 a 32 bit mark value, or another value having a length based on the number of devices attached to a common network to ensure a very low probability of multiple identical values.

In a further embodiment, the processing logic generates 502 the mark by seeding a cryptographic random number generator with a nonce from a true random number generator to create a tuple having a value of <index:data>, where index is the number of bytes extracted from the cryptographic random number generator at the time the associated data was read from the cryptographic random number generator.

At block 504, the processing logic embeds the mark in a frame. In one embodiment, the processing logic embeds the mark as after the target protocol address of an ARP frame, as described previously with reference to FIG. 3. For example, the processing logic is configured to embed the mark in the ARP frame, the contents of which become the payload of an Ethernet frame. Alternatively, the processing logic, at block 504, embeds the mark in any network frame, including the NDP frame of FIG. 4.

At block 506, the processing logic saves a copy of the mark in a buffer. In one embodiment, the processing logic saves a copy of the mark in the mark repository 206 as described above with reference to FIG. 2. The mark repository 206 may comprise a computer readable storage device configured to maintain a data structure (e.g., lookup table) capable of maintaining a copy of the mark.

At block 508, the processing logic transmits the mark. The processing logic is configured to transmit the frame with the embedded mark over a communications network. In one embodiment, the communications network is a public network (e.g., Internet), a private network (e.g., a local area Network (LAN) or wide area network (WAN)), or a combination thereof. The communication network may additionally include a wireless LAN or wireless WAN such as provided by a wireless carrier.

Figure 6:
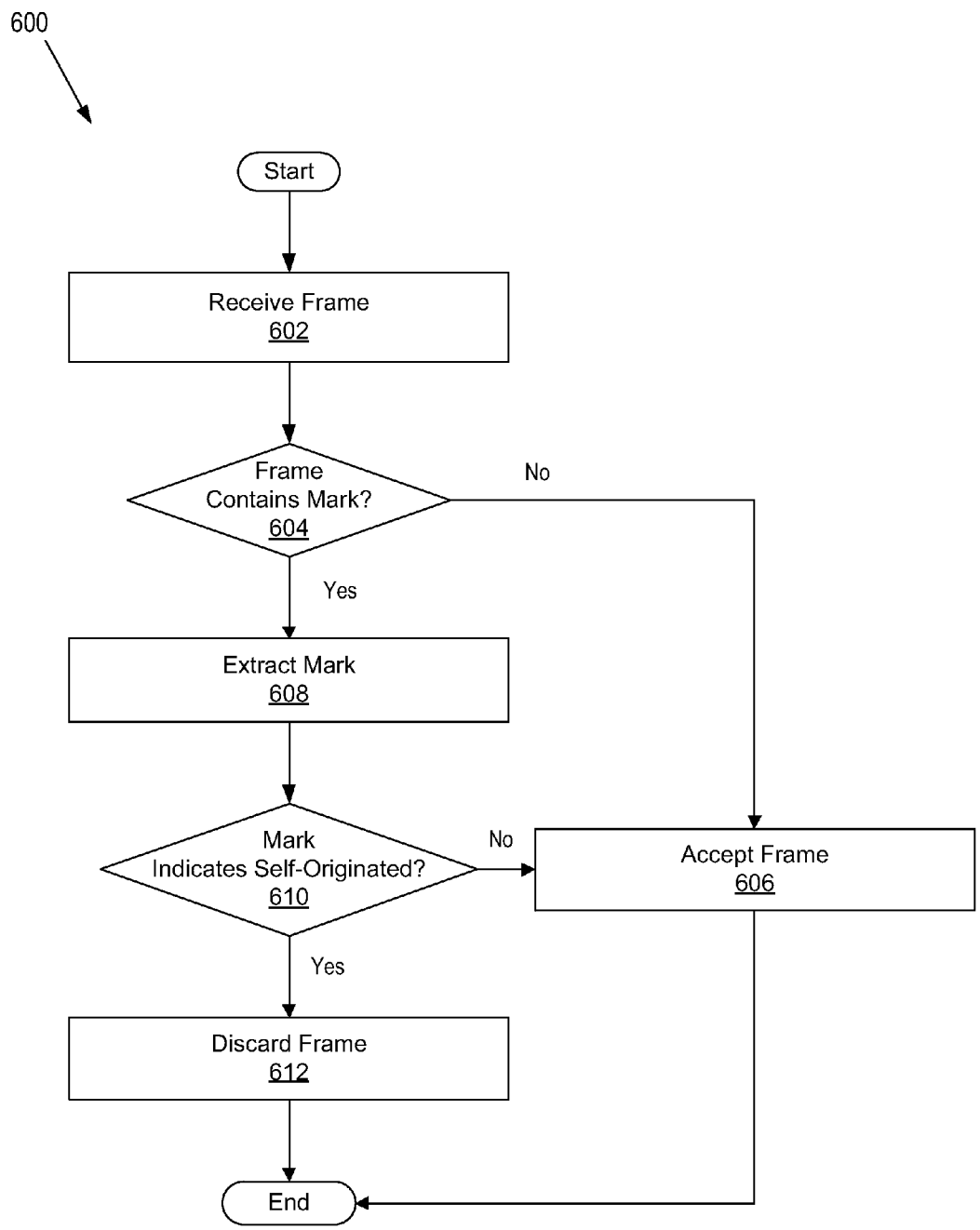
FIG. 6 illustrates a flow diagram of one embodiment of a method for receiving and analyzing a frame

FIG. 6 illustrates a flow diagram of one embodiment of a method 600 for receiving and analyzing a frame. At block 602, the processing logic receives a frame over a communication channel of the network. In one embodiment, the processing logic receives a frame over wired or wireless communication channel in a private or public network, as described with reference to FIG. 1. At block 604, processing logic determines if the frame contains a mark or identifier.

In one embodiment, processing logic determines if the frame contains a mark by analyzing each frame received to determine if the frame contains the mark. Alternatively, processing logic analyzes only frames of a certain protocol. For example, processing logic may be configured to analyze only frames related to address resolution including, but not limited to, address resolution protocol frames or neighbor discovery protocol frames. If processing logic determines that the received frame does not contain an embedded mark, the processing logic accepts the frame at block 606.

If, at decision block 604, the processing logic determines that the frame does contain an embedded mark, the processing logic extracts the mark at block 608. Processing logic parses the frame to extract the mark by, in one embodiment, identifying the protocol of the frame and determining the location of the mark in the frame. For example, in an ARP frame, the mark may be embedded after the target protocol address, and accordingly, the processing logic extracts the embedded mark by parsing the frame and extracting the data following the target protocol address.

At block 610, the processing logic determines if the extracted mark indicates that the frame is looped-back to the originating computing device. The processing logic analyzes the mark and compares the mark to values stored in the mark repository (e.g., mark repository 206 of FIG. 2) or other memory buffer. If the processing logic does not match the value(s) stored in the mark repository then the processing logic accepts the frame at block 606. A matched mark value is indicative of a looped-back frame, and therefore, if the mark value does not match then the processing logic determines that the frame is not a looped-back frame and the frame is accepted. If the processing logic determines that the frame is looped back, the processing logic discards the frame at block 612.

Figure 7:
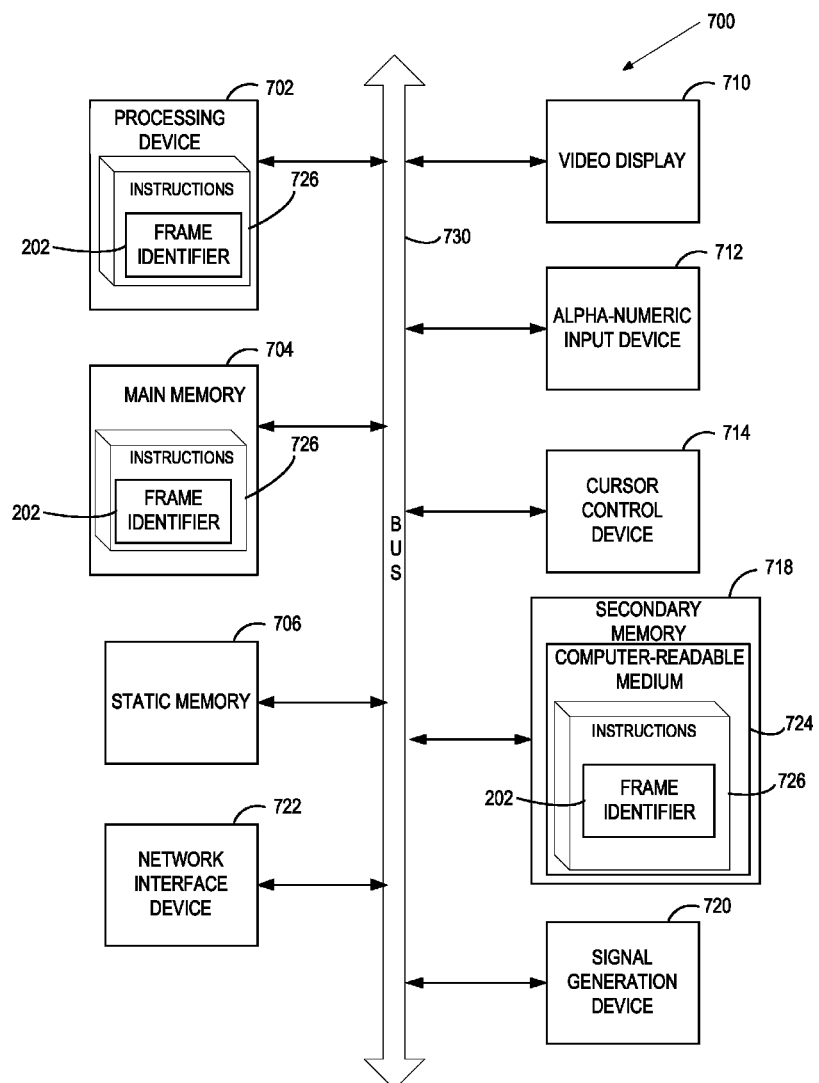
FIG. 7 illustrates one embodiment of a computer system for facilitating the execution logging stream serialization.

FIG. 7 illustrates one embodiment of a computer system for facilitating the execution logging stream serialization. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 530.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the frame identifier 202. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "comparing," "analyzing," "parsing," "identifying," "storing," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
    generating, at a network device comprising a processing device, a frame instance identifier value indicative of the network device, wherein the frame instance identifier value comprises an encoding that uniquely identifies the frame instance identifier value;
    embedding the frame instance identifier value at a location in a first networking frame in view of a characteristic of the first networking frame, wherein the characteristic relates to one of an Address Resolution Protocol (ARP) or a Neighbor Discovery Protocol (NSP);
    storing a copy of the frame instance identifier value in a mark repository;
    transmitting the first networking frame over a communication channel;
    receiving, at the network device, a plurality of networking frames that comprises the first networking frame;
    identifying the characteristic of the first networking frame;
    determining the location of the frame instance identifier value in view of the characteristic;
    extracting the frame instance identifier value from the location of the first networking frame;
    analyzing, by the processing device, the received networking frames to identify whether the first networking frame comprises the frame instance identifier value indicating that the first networking frame originated from the network device by determining whether the extracted frame instance identifier value matches the frame instance identifier value in the mark repository; and
    discarding the first networking frame in response to the extracted frame instance identifier value of the first networking frame matching the frame instance identifier value in the mark repository and determining that the first networking frame originated from the network device.

2. The method of claim 1, further comprising accepting one or more of the received networking frames that do not contain frame instance identifier values.

3. The method of claim 1, further comprising accepting one or more of the received networking frames that contain frame instance identifier values indicating that the one or more of the received networking frames did not originated from the network device.

4. The method of claim 1, wherein analyzing the received networking frames comprises:
    identifying a set of received networking frames containing frame instance identifier values; and
    comparing the frame instance identifier values of received networking frames from the set with the frame instance identifier values stored in the mark repository.

5. The method of claim 1, wherein generating the frame instance identifier value further comprises generating a random value in view of characteristics of the network attached device, the characteristics comprising at least one of a time value in response to the frame instance identifier value being generated, a hardware address of a network adapter, a processor identifier, a system board identifier, or an application identifier.

6. The method of claim 1, wherein generating the frame instance identifier value further comprises generating a tuple <index:data>, where index is generated from a cryptographic number generator.

7. The method of claim 1, wherein generating the frame instance identifier value further comprises generating a 32 bit random number.

8. The method of claim 1, further comprising originating, at the network device comprising the processing device, the first networking frame.

9. A non-transitory computer readable storage medium comprising instructions that, when executed by a processing device, cause the processing device to:
    generate, at a network device comprising the processing device, a frame instance identifier value indicative of the network device, wherein the frame instance identifier value comprises an encoding that uniquely identifies the frame instance identifier value;
    embed the frame instance identifier value at a location in a first networking frame in view of a characteristic of the first networking frame, wherein the characteristic relates to one of an Address Resolution Protocol (ARP) or a Neighbor Discovery Protocol (NSP);
    store a copy of the frame instance identifier value in a mark repository;
    transmit the first networking frame over a communication channel;
    receive, at the network device, a plurality of networking frames;
    identify the characteristic of the first networking frame;
    determine, by the processing device, the location of the frame instance identifier value in view of the characteristic;
    extract the frame instance identifier value from the location of the first networking frame;
    analyze, by the processing device, the received networking frames to identify whether the first networking frame comprises the frame instance identifier value indicating that the first networking frame originated from the network device by determining whether the extracted frame instance identifier value matches the frame instance identifier value in the mark repository; and
    discard the first networking frame in response to the extracted frame instance identifier value of the first networking frame matching the frame instance identifier value in the mark repository and determining that the first networking frame originated from the network device.

10. The non-transitory computer readable storage medium of claim 9, including further instructions that, when executed by the processing device, cause the processing device to accept one or more of the received networking frames that do not contain frame instance identifier values.

11. The non-transitory computer readable storage medium of claim 9, including further instructions that, when executed by the processing device, cause the processing device to accept one or more of the received networking frames that contain frame instance identifier values indicating that the one or more of the received networking frames were did not originated from the network device.

12. The non-transitory computer readable storage medium of claim 9, wherein in response to analyzing the received networking frames, the processing device is to:
identify a set of received networking frames containing frame instance identifier values; and
compare the frame instance identifier values of received networking frames from the set with frame instance identifier values stored in the mark repository.

13. The non-transitory computer readable storage medium of claim 9, including further instructions that, when executed by the processing device, cause the processing device to generate a random value in view of characteristics of the network attached device, the characteristics comprising at least one of a time value in response to the frame instance identifier value being generated, a hardware address of a network adapter, a processor identifier, a system board identifier, or an application identifier.

14. The non-transitory computer readable storage medium of claim 9, including further instructions that, when executed by the processing device, cause the processing device to generate a tuple <index:data>, where index is generated from a cryptographic number generator.

15. The non-transitory computer readable storage medium of claim 9, including further instructions that, when executed by the processing device, cause the processing device to originate the first networking frame.

16. An apparatus comprising:
a memory; and
a processing device, operatively coupled to the memory, to:
generate, at a network device, a frame instance identifier value indicative of the network device, wherein the frame instance identifier value comprises an encoding that uniquely identifies the frame instance identifier value;
embed the frame instance identifier value at a location in a first networking frame in view of a characteristic of the first networking frame, wherein the characteristic relates to one of an Address Resolution Protocol (ARP) or a Neighbor Discovery Protocol (NSP);
store a copy of the frame instance identifier value in a mark repository;
transmit the first networking frame over a communication channel;
receive a plurality of networking frames that comprises the first networking frame;
identify the characteristic of the first networking frame;
determine the location of the frame instance identifier value in view of the characteristic;
extract the frame instance identifier value from the location of the first networking frame;
analyze the received networking frames to identify whether the first networking frame comprises the a frame instance identifier value indicating that the first networking frame originated from the network device by determining whether the extracted frame instance identifier value matches the frame instance identifier value stored in the mark repository; and
discard the first networking frame in response to the extracted frame instance identifier value of the first networking frame matching the frame instance identifier value in the mark repository and determining that the first networking frame originated from the network device.

17. The apparatus of claim 16, wherein the processing device is further to accept one or more of the received networking frames that contain frame instance identifier values indicating that the one or more of the plurality of received networking frames did not originated from the network device.

18. The apparatus of claim 16, wherein the processing device is further to:
embed the frame instance identifier value in a new networking frame; and
transmit the new networking frame over a communication channel.

19. The apparatus of claim 16, wherein the processing device is further to originate the first networking frame.

* * * * *